H. T. HOPS.
OIL GAUGE.
APPLICATION FILED JULY 20, 1921.
1,430,377.
Patented Sept. 26, 1922.
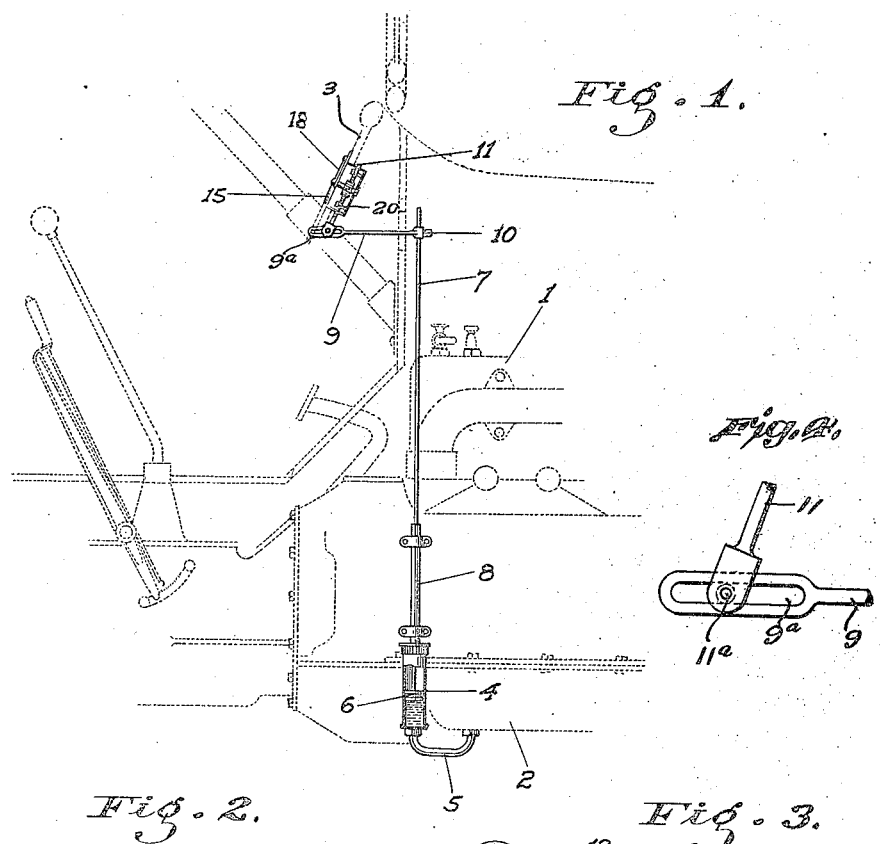
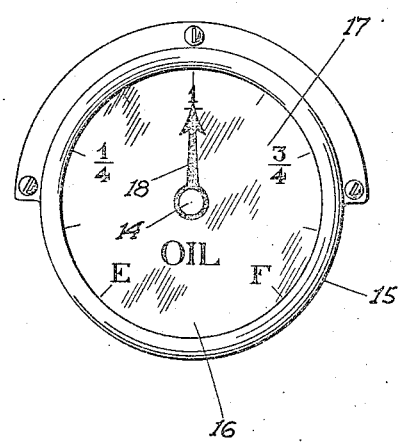
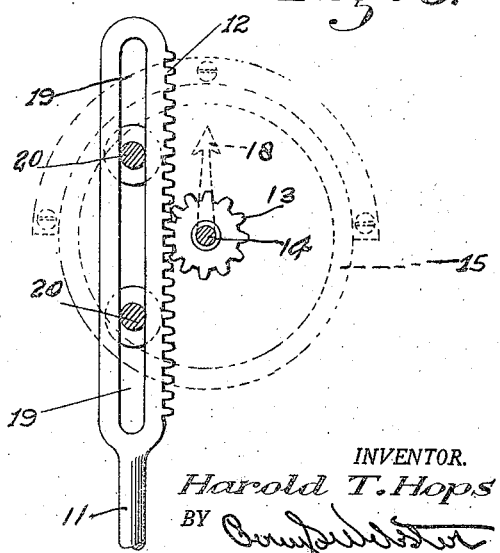
INVENTOR.
Harold T. Hops
BY
ATTORNEY Patented Sept. 26, 1922.

1,430,377

UNITED STATES PATENT OFFICE.

HAROLD T. HOPS, OF ACAMPO, CALIFORNIA.

OIL GAUGE.

Application filed July 20, 1921. Serial No. 486,144.

*To all whom it may concern:*

Be it known that I, HAROLD T. HOPS, a citizen of the United States, residing at Acampo, county of San Joaquin, State of California, have invented certain new and useful Improvements in Oil Gauges; and I do declare the following to be a full, clear, and exact description of the same, reference being had to the accompanying drawings, and to the characters of reference marked thereon, which form a part of this application.

This invention relates to improvements in oil gauges, and particularly to a type adapted to be used in connection with internal combustion engines as installed on automobiles.

The principal object of the invention is to provide a gauge positioned where it can be readily seen at all times by the driver of the car, and a marking finger for the dial thereof whose movement is controlled by a float resting in the oil in the crank case or other reservoir of the engine, from which the latter draws its lubricating supply, the height or relative quantity of oil being indicated on the dial.

Another object is to provide a device of this character which is readily adaptable for service irrespective of the relative positions and distances between the gauge dial and the actual oil supply.

As far as I am aware, the gauges ordinarily provided for the oil reservoirs of automobile engines are directly connected to the upper crank case block, and to see the same, the hood must be lifted. Also, such gauges rapidly accumulate dirt on their faces, rendering frequent cleaning necessary. As a consequence, they are often neglected, with sometimes disastrous results to the engine.

With my improved device however, the indicating dial is preferably positioned on the instrument board of the car, along with the other well-kept dials and gauges.

A further object of the invention is to produce a simple and inexpensive device and yet one which will be exceedingly effective for the purposes which it is designed.

These objects I accomplish by means of such structure and relative arrangement of parts as will fully appear by a perusal of the following specification and claims.

In the drawings similar characters of reference indicate corresponding parts in the several views.

Fig. 1 is a fragmentary side outline of a portion of an automobile adjacent the engine, showing my improved oil gauge structure.

Fig. 2 is an enlarged front view of the indicating dial.

Fig. 3 is a similar view, with the dial-face removed, and showing the means for rotating the dial-finger.

Fig. 4 is a fragmentary view showing the means for connecting the rack-bar and horizontal arm.

Referring now more particularly to the characters of reference on the drawings, the numeral 1 denotes in general a gas engine having a crank-case 2 in which the lubricating oil is kept. Above and to the rear of the engine is the usual instrument board 3.

My improved structure comprises a vertical cylinder 4 positioned at any point relative to the crank case, so long as the bottom thereof is about on a level with the bottom of the crank-case, this cylinder being connected at its bottom to the bottom of the crank-case by a pipe 5. Slidable vertically in the cylinder is a float 6 to which is attached a stem 7 projecting up through a guide sleeve 8 on the cylinder to a point substantially near the bottom level of the board 3, the sleeve itself terminating above the highest possible level of the oil.

A horizontal arm 9 is connected to the stem 7 adjacent its upper end by an adjustable clamp 10, whereby to alter the height of the arm on the stem. The opposite end of the arm has a horizontal slot $9^a$, through which passes a pin or roller $11^a$ on the lower end of a vertical rack-bar 11 having teeth 12 on one edge meshing with a pinion 13 mounted on a pin 14 journaled in a casing 15 itself mounted on the board 3, there being a dial face 16 on said casing through which the pin projects, this face being provided with markings 17 to designate the relative amount of oil in the crank case, while a finger 18 on the pin 14 is placed to point to any one of said markings.

The bar 11 is slotted as at 19 to receive fixed guide members 20 therethrough which are positioned relative to the pin 14 to maintain said rack in constant mesh with the pinion and at right angles thereto.

By reason of the adjustable clamp member 10, the setting of the members 9 and 11 for different heights of instrument boards from their engine bases may be varied, while by reason of the flexible connection between the members 9 and 11, which allow for swivel and sliding movement thereof, the member 11 may be set at any desired angle relative to the member 9 or to a vertical plane, in order to accommodate the device to boards of a different slant, since there are many such.

In operation, when the float 6 is at the bottom of the cylinder, the dial finger points to the "empty" mark on the face, while when said float is raised by the filling of the crank case with oil, the needle will move around and point to the various marks until when the crank case is full, the needle will point to the "full" mark on the face, the pinion and rack being designed to provide the correct relation.

As shown in the drawing, the bar 11 is disposed at an acute angle to the arm 9 and rod 7. As the latter raises the bar raises also, being able to maintain its angular setting and proper meshing with the pinion by reason of the slotted connection between the members 9 and 11, which permits of relative sliding movement therebetween.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent, is:—

1. A gauge for liquid-reservoirs including an indicating dial, a rotatable finger co-operating therewith, a float in the liquid, a vertical stem mounted on the float and offset from the dial, a pinion fixed in connection with the finger, a rack bar meshing with the pinion, said bar and dial being substantially vertical, a horizontal arm mounted on the stem, and a connection between the arm and bar to allow of relative sliding and swivel movement therebetween.

2. A gauge for liquid-reservoirs including an indicating dial, a rotatable finger co-operating therewith, a float in the liquid, a vertical stem mounted on the float and offset from the dial, a pinion fixed in connection with the finger, a rack bar meshing with the pinion, said bar and dial being substantially vertical, a horizontal arm, adjustably mounted on the stem whereby to alter its vertical setting, and means between the arm and bar whereby relative sliding and swivel movement may be had therebetween.

3. A gauge for liquid-reservoirs including an indicating dial, a rotatable finger co-operating therewith, a float in the liquid, a vertical stem mounted on the float and offset from the dial, a pinion fixed in connection with the finger, a rack bar meshing with the pinion, said bar and dial being substantially vertical, a horizontal arm mounted on the stem and operatively connected to the bar, and means whereby the angle of setting of the dial relative to the stem may be altered without interfering with the meshing of the rack bar with the pinion and the functioning thereof.

4. A gauge for liquid-reservoirs comprising a fixed indicating dial, a movable finger cooperating therewith, a vertical cylinder outside the reservoir and in communication therewith, and positioned to have the same depth of liquid therein as said reservoir, said dial being substantially vertical and positioned in a plane offset from the cylinder, a float in the latter, a stem fixed on the float, a pinion fixed in connection with the finger, an arm projecting from the stem toward the dial, a rack engaging the pinion, and means connecting the rack to the arm for relative sliding and swivel movement therebetween.

In testimony whereof I affix my signature.

HAROLD T. HOPS